Sept. 13, 1960 R. ELLIS 2,952,423
AERIAL VEHICLE
Filed Dec. 2, 1957
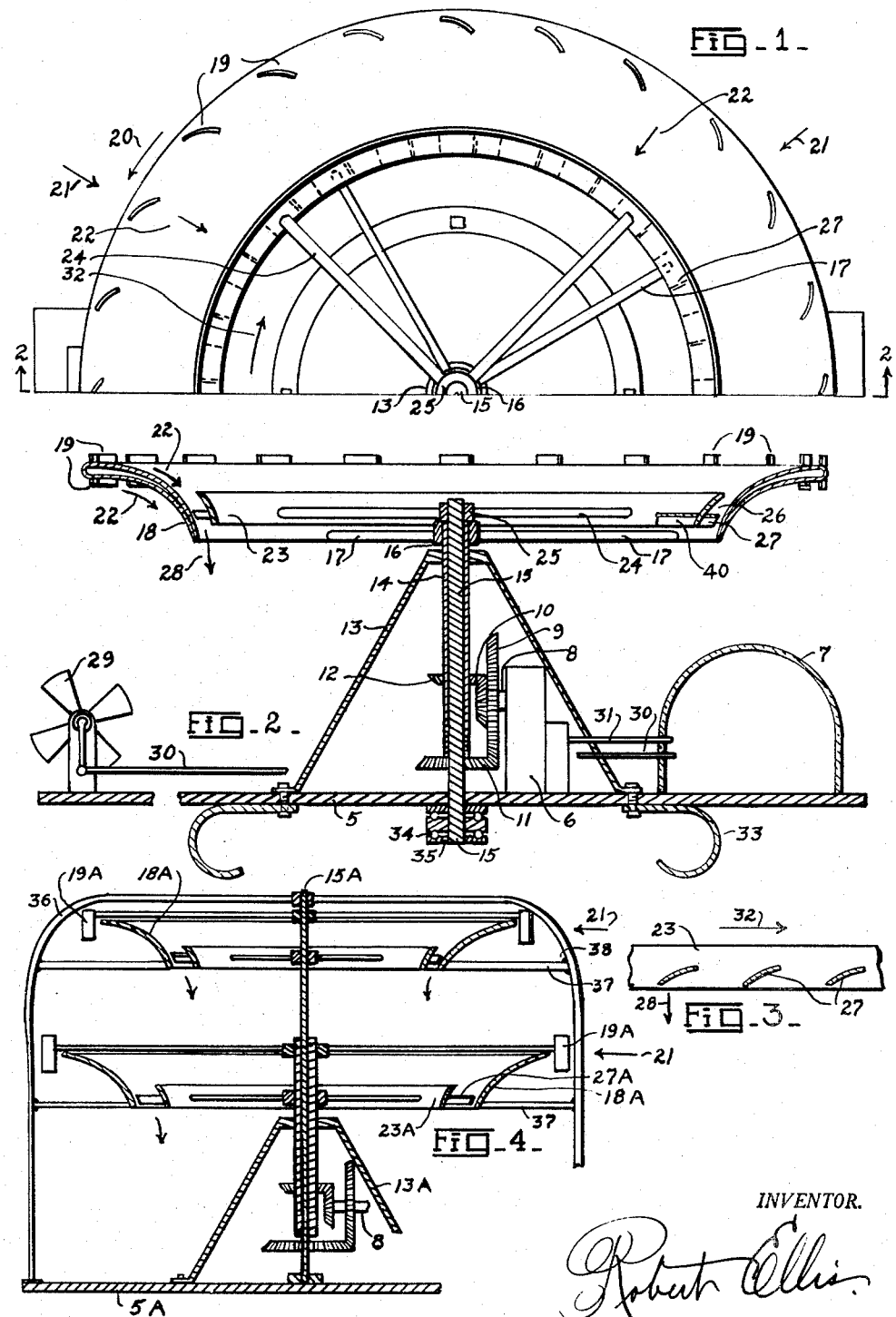
INVENTOR.
Robert Ellis 10 # United States Patent Office 2,952,423
Patented Sept. 13, 1960

2,952,423
AERIAL VEHICLE
Robert Ellis, 3355 Country Club Road, Bronx 65, N.Y.
Filed Dec. 2, 1957, Ser. No. 700,073
3 Claims. (Cl. 244—12)

This invention relates to means for creating aerial sustentation of a vehicle and the principal object of the invention is the provision of means for inducing the largest possible quantity of free air to flow from a horizontal direction centripetally over a ring-shaped air-foil and then downwardly through the inside aperture thereof without causing "break-down" or turbulence of the air stream, thus greatly increasing the upward re-action of the vehicle over the customary bladed helicopter.

Another object of the invention is the provision of means for causing the annular shaped air-foil to rotate on a vertical axis, the air-foil being provided with vertically disposed vanes on its outer periphery, which vanes are caused to impel free air from its outer circumference centripetally over and under the air foil surfaces during rotation thereof.

Still another object of the invention is the provision of means for causing the centripetally propelled air to flow downwards through the open center of the annular air-foil without causing turbulence therein.

And still another object of the invention is the provision of means for causing approximately equal rotary re-action between the revolving elements.

And still another object of the invention is the provision of means for permitting a plurality of annular air-foils to be arranged in superimposed position around a centrally positioned operating shaft and incidentally to rotate the operating means in opposite directions to obtain equal re-active effect.

Other and further objects will appear in the specifications and be specifically pointed out in the appended claims, reference being had to the accompanying drawings exemplifying the invention, and in which:

Fig. 1 shows a top view of the aerial vehicle illustrating one-half part thereof.

Fig. 2 is a vertical cross section on the line 2—2 of Fig. 1.

Fig. 3 shows a development of part of the annular air deflector illustrating the shape of the downwardly inclined vanes.

Fig. 4 is a vertical cross section similar to Fig. 2 with the variation in that the annular air-foils are stationary with the fuselage and illustrating how a plurality of annular air-foils may be superimposed, thus greatly increasing the capacity of the vehicle.

Referring to the drawings in which like numerals and characters of reference refer to similar parts throughout the several views, the numeral 5 denotes the base of the fuselage of aerial vehicle or similar aerial vehicle on which is mounted the customary engine 6 and operator's cubicle 7. To the horizontally disposed engine shaft 8 are attached the two bevel gears or friction wheels 9 and 10 which mesh with or bear against the horizontally disposed gears or wheels 11 and 12 respectively, in such manner as to rotate the latter two wheels in opposite directions, as will be readily understood. The engine 6 and gears are housed within the cone-shaped deflector 13, through the center of which the two vertically disposed shafts 14 and 15 protrude, the shaft 14 being hollow and attached to wheel 12 while shaft 15 is disposed within hollow shaft 14 and attached to wheel 11, the upper part 13A of the conical air deflector serving as a bearing. To hollow shaft 14 is attached hub 16 to which spokes 17 are secured, the outer end of each spoke being attached to the annular shaped air-foil 18, the "front" 18A or head of this annular air-foil being on the outer perimeter while the "rear" 18B or tail of the air-foil is on the inner perimeter as illustrated. At the front or outer perimeter of this annular air-foil are mounted vanes 19, all of which are so disposed that, when the air-foil 18 is rotated in the direction of arrow 20, free air is drawn from all directions horizontally, as indicated by arrows 21, and propelled centripetally in the direction of arrows 22 over and under the annular air-foil surfaces in the same manner and giving the same efficient results as in the conventional air-plane. As it is necessary to dispose of the centripetally driven air-stream without turbulence in order to maintain the efficiency of the annular air-foil, the inner periphery of the air-foil is abruptly curved downward as illustrated and the annular deflector 23 disposed inside the center opening of the said annular air-foil 18 and designed to rotate therein in the opposite direction according to arrow 32 through being attached to spokes 24 which in turn are attached to hub 25 and inner shaft 15. The annular space 26 between the air-foil 18 and annular deflector 23 is so formed that the air stream flowing over the annular air-foil 18 is caused to flow therethrough by means of deflecting vanes 27 attached to deflecting shield 23 which latter, when rotated, causes a strong downward current of air in the direction of arrow 28 and incidentally prevents turbulence by causing the boundary layer of air flowing over said upper surface of annular air-flow 18 to follow the abruptly curved inner perimeter and flow downwardly with high efficiency. It will thus be apparent that a strong and effective upward thrust is exerted by the upper annular air-foil 18, the lower surface of the air-foil 18 and the vanes 27 attached to rotating deflecting shield 23. The flow of air remains smooth although its course as indicated by arrows 21, 22 and 28 although it travels faster in proportion to its convergence to annular space 26, this being caused by the suction exerted by rotating vanes 27, it being noted that the speed of rotation of the annular deflecting shield 23 is greater than that of the annular air-foil 18, this being effected because the gear ratio between wheels 9 and 11 is greater than between wheels 10 and 12. If desired, additional downwardly deflecting vanes or propellers 40 may be attached to the inner periphery of the deflecting shield 23 as indicated in Fig. 2. It will thus be apparent that the superior lifting ability of the rapidly moving airplane is given to the relatively stationary aerial vehicle through this invention.

As both rotary elements, annular air-foil 18 and annular deflecting shield 23, revolve in opposite directions, the horizontal re-active thrust is approximately equal and any inaccuracies, temporary deviations as well as directional travel of the aerial vehicle 5, can easily be adjusted by operating the customary propeller 29 mounted to the rear of the base 5, the control rod 30 leading to the operator's cubicle 7. Control rod 31 leads to the engine 6. The downward flowing air from the rotating elements is effectively deflected by the conical engine housing 13. The aerial vehicle may land smoothly on the springs 33. The upward thrust of the rotating elements is absorbed by the ball bearings 34, the shaft 15 being secured to the disc 35. This aerial vehicle may also be used as a toy. In larger types of aerial vehicles it may be undesirable to use such large rotary elements as heretofore described and for this diversion the method of design illustrated in Fig. 4 may be used wherein a plurality of annular air-foils 18A are attached stationary with the fuselage or body 5 of the aerial vehicle while the propelling vanes 19A and 27A and the inner annular shield 23A rotate, the vanes propelling the free air in a similar manner as illustrated in Figs. 1 and 2. The annular superimposed air-foils 18A are secured to the base 5A by means of the frame 36 to which radial spokes are welded at 38. This frame 36 also serves as an upper central bearing for the shaft 15A, securing greater rigidity of operation. It will be noted that herein the upper rotary elements revolve in an opposite direction from the lower rotary elements, thus equalizing the horizontal radial thrust, the speed of rotation being approximately the same. The diameters of both the lower air-foil 18A and deflecting shield 23A are greater than their counterparts above to allow space for the greater quantity of air flowing therethrough.

From the foregoing description it will be apparent that I have evolved an aerial vehicle of much greater lifting efficiency and compactness than the customary "helicopter" with its large and dangerous rotary blades and inefficient operation.

Various changes may be made in the embodiment of the invention hereinabove specifically described without departing from or sacrificing the advantages of the invention as defined in the appended claims.

I claim:

1. In a heavier than air vehicle, a fuselage having a source of rotatable power mounted thereto, a vertically disposed rotatable shaft attached to said source of power, a horizontally disposed ring-shaped air-foil centrally attached to said shaft, and deflecting vanes attached to the outer perimeter of said air-foil, said vanes so disposed as to deflect free air centripetally in a horizontal direction over and under the conventional curved air-foil surfaces and downwardly through the central aperture thereof.

2. In a heavier than air vehicle as in claim 1, the said annular air-foil curving abruptly downward near its inner perimeter, an annular air-flow deflector located within said abruptly downwardly curved portion of said air-foil and suitably spaced therefrom to permit the free air flowing from the upper surface of the annular air-foil to pass therebetween, means for attaching said annular deflector to said source of rotary power, and blades attached to the outer perimeter of said annular deflector so disposed as to create a downward flow of free air in the annular space between said annular air-foil and said annular deflector.

3. In a heavier than air vehicle, a fuselage provided with a source of rotary power, a vertically disposed rotatable shaft attached to said source of power, a hollow shaft encasing said first named shaft and attached to said source of power, means for rotating said shafts in opposite directions, a ring-shaped horizontally disposed air-foil attached to the upper end of said hollow shaft, an annular-shaped air deflector mounted within and spaced a suitable distance from the inner periphery of said ring-shaped air-foil, said annular deflector being attached to said inner shaft, vertically extending vanes mounted on the outer periphery of said ring-shaped air-foil adapted to force free air horizontally and centripetally over and under the surfaces of said ring-shaped air-foil, and horizontally disposed blades mounted to the outer periphery of said annular deflector adapted to force free air downwardly through the annular space between the inner periphery of said ring-shaped air-foil and the outer periphery of said annular-shaped air deflector.

References Cited in the file of this patent

UNITED STATES PATENTS 2,843,339    Strieb _____ Aug. 15, 1958